United States Patent Office 2,727,024
Patented Dec. 13, 1955

2,727,024

GROUP VA METAL OXIDE AND ALKALI METAL ALUMINUM HYDRIDE CATALYST FOR OLEFIN POLYMERIZATION

Edmund Field, Chicago, and Morris Feller, Park Forest, Ill., assignors to Standard Oil Company, Chicago, Ill., a corporation of Indiana No Drawing. Application August 11, 1953,
Serial No. 373,684

13 Claims. (Cl. 260—94.9)

This invention relates to a novel polymerization process. In a more specific aspect, this invention relates to a novel process for the polymerization of ethylene, propylene or their mixtures by contact with a catalytic mixture prepared by admixing an alkali metal aluminum hydride having the general formula MAlH$_4$, wherein M represents an alkali metal with a solid catalytic material containing an oxide of a metal of group VA of the periodic table, viz., one or more of the oxides of V, Nb or Ta.

One object of our invention is to provide novel and highly useful catalysts for the preparation of high molecular weight polymers from ethylene-containing gas mixtures. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials. A further object is to provide a relatively low temperature, low pressure process for the conversion of ethylene-containing gases to high molecular weight resinous or plastic materials. An additional object of the present invention is to provide a process for the copolymerization of ethylene with other polymerizable materials to provide novel resinous materials. Yet another object of our invention is to provide a process for the preparation of solid, elastic polymers from propylene. These and other objects of our invention will become apparent from the ensuing description thereof.

Briefly, the inventive process comprises the conversion of ethylene, propylene or their mixtures principally to high molecular weight normally solid, resinous polymers by contact with a catalytic material prepared from a group VA metal oxide, preferably supported on a difficultly reducible metal oxide, and a metal hydride having the formula MAlH$_4$, wherein M represents an alkali metal. The inventive process is effected at temperatures between about 130° C. and about 325° C., preferably between about 180° C. and 260° C., and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., iso-octane, are preferred. The conversion of ethylene or propylene can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention leads to polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000, and tough, resinous ethylene homopolymers having an approximate specific viscosity ($\times 10^5$) of 10,000 to more than 300,000 [($\pi$ relative$-1$)$\times 10^5$]. By the term "tough, resinous polyethylene" as used in the present specification and claims, we mean polymer having a brittle point below $-50°$ C. (A. S. T. M. method D746–51T), impact strength greater than two foot pounds per inch of notch (A. S. T. M. method D256–47T—Isod machine) and minimum elongation at room temperature (25° C.) of 100%.

The process of the present invention can be employed to effect the conversion of ethylene with other polymerizable materials, e. g. propylene. The molar ratio of ethylene to propylene may be between about 0.1 and about 10. Other polymerizable materials include monoolefinic hydrocarbon such as n-butylenes, isobutylene, t-butylethylene, and the like, usually in proportions between about 1 and about 25 percent by volume, based on the volume of ethylene.

An important feature of the present invention is the employment of a catalyst prepared from vanadia-containing catalyst and a complex metal hydride having the formula MalH$_4$, wherein M represents an alkali metal, viz.: lithium, sodium, potassium, rubidium or cesium. We may also employ mixtures of said metal hydrides. The employment of said metal hydride has numerous important practical consequences, as compared to processes wherein said metal oxide catalysts are employed alone. Thus, the presence of MAlH$_4$ increases the yields of solid polymers which can be obtained from ethylene, the metal oxide-containing catalyst functions well in the presence of large proportions of liquid reaction medium, the metal oxide-containing catalyst retains strong polymerization activity for a long period of time (long catalyst life), polymers having desirable ranges of physical and chemical properties can be readily produced by controlling the reaction variables, etc., as will appear from the detailed description and operating examples which follow.

It might be assumed that the complex metal hydrides function merely to react with catalyst poisons which might be present in small proportions of the order of a few parts per million in ethylene, propylene and/or in the liquid reaction medium; we have found, however, that even extremely pure ethylene or propylene and liquid reaction medium which have been contacted with alkali metal or said metal hydrides under reaction conditions and directly thereafter contacted in a separate zone with a group VA oxide catalyst, do not produce solid polymer in the high yields or quality which can be attained by the process of the present invention.

The alkali metal aluminum hydrides may be prepared by the reaction of the desired alkali metal hydride with AlCl$_3$, usually under vacuum or under an inert gas blanket (to prevent access of moisture, CO$_2$ or oxygen) and in the presence of a solvent for the said hydrides in which the alkali metal chloride produced by the reaction is insoluble:

$$4MH + AlCl_3 \xrightarrow{\text{solvent}} MAlH_4 + 3MCl$$

wherein M represents an alkali metal. The solvent is then removed from the MAlH₄ by conventional means, usually low pressure distillation.

We have found that ethylene can be converted to normally solid polymers by contacting it with the claimed catalysts without the necessity of a deliberate pre-reduction step, which is essential when group VA metal oxides are employed as the sole catalysts.

In the presence of the claimed metal hydrides, the group VA metal oxide catalysts can be employed without supports or upon various difficultly reducible metal oxides, e. g., on alumina, titania or zirconia; silica supports such as silica gel, kieselguhr, diatomite; silica-alumina, alumino-silicates, such as various clays and bleaching earths; and even adsorptive carbon, which is however not preferred. In a practical process, it is preferable to furnish a difficultly reducible metal oxide support for the group VA metal oxide catalyst, e. g. gamma-alumina.

The proportion of alkali metal aluminum hydride which is employed can be varied from about 0.001 to about 2 parts by weight per part by weight of group VA metal oxide catalyst (total weight of solid catalyst), usually between about .05 and about 0.5 part by weight. The optimum proportions can readily be determined in specific instances, by simple small-scale tests with the specific feed stocks, liquid reaction medium, reaction medium: catalyst ratio, catalyst, temperature, pressure and nature of the product which is desired. Usually LiAlH₄ is employed in proportions between about 0.05 and about 0.5 part by weight per part by weight of vanadia (or other catalyst) at ratios between about 5 and about 2000 volumes of liquid reaction medium per part by weight of vanadia catalyst.

The relative proportions of difficultly reducible metal oxide support to the catalytic metal oxide is not critical and may be varied throughout a relatively wide range such that each component is present in amounts of at least approximately 1 weight percent. The usual metal oxide support ratios are in the range of about 1:20 to 1:1, or approximately 1:10. We may employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for our catalysts may be prepared in any known manner and the oxides of vanadium or other group VA metal may likewise be incorporated in, or deposited on, the base in any known manner.

The vanadia or other vanadium-oxygen compound, such as cobalt vanadate, may be incorporated in the catalyst base in any known manner, e. g. by impregnation, coprecipitation, co-gelling, and/or absorption, and the catalyst base and/or finished catalyst may be heat stabilized in the known manners heretofore employed in the preparation of hydroforming or hydrofining catalysts. Cobalt, chromium, magnesium, calcium, zinc, nickel and copper salts of vanadic, niobic and tantalic acids may also be employed, with or without a support.

Although no reducing treatment need be effected on group VA metal oxide catalysts when they are employed in the presence of alkali metal aluminum hydrides, a reducing or conditioning treatment is preferred in commercial processing. The conditioning or reducing treatment of the group VA metal pentoxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 250° C. and about 850° C., although it is more often employed at temperatures within the range of 350° C. to 550° C. The hydrogen partial pressures in the reduction or conditioning operation may be varied from subatmospheric pressures, for example even 0.1 pound (absolute) to relatively high pressures up to 3000 p. s. i. g., or even more. The simplest reducing operation may be effected with hydrogen at about atmospheric pressure.

Lithium aluminum hydride, an exceptionally active reducing agent, conditions and activates catalysts containing group VA metal oxides even at temperatures as low as 35° C., although in general temperatures between about 100° C. and about 300° C. can be employed. In practice, for example, a catalyst containing free or chemically combined group VA metal pentoxide is treated with a suspension of LiAlH₄ in a liquid hydrocarbon solvent at weight ratios of about 0.01 to about 1 LiAlH₄ per weight of solid catalyst. Sodium hydride (or sodium plus H₂) may be used for reducing and conditioning group VA catalysts such as V₂O₅ at temperatures above about 180° C. and can be employed in the same proportions as LiAlH₄.

The conditioning treatment hereinabove described is desirable not only for fresh catalyst, but also for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salt solutions, or dilute aqueous acids, thereafter burning combustible deposits therefrom with oxygen followed by the conditioning step.

The catalysts can be employed in various forms and sizes, e. g., as powder, granules, microspheres, broken filter cake, lumps, or shaped pellets. A convenient form in which the catalysts may be employed is as granules of about 20-100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 130 and about 325° C. Increasing the polymerization temperature tends to reduce the average molecular weight and density of the polymer produced by the process. Usually polymerization is effected in the present process at temperatures between about 180° C. and about 260° C. or the preferred narrower range of about 230° C. to about 250° C. The conjoint use of polymerization temperatures between about 230° C. and about 250° C. and a liquid hydrocarbon reaction medium such as benzene, xylenes, decalin, or methyl decalins is highly desirable in producing ethylene polymers having specific viscosities ($\times 10^5$) ranging on the average from about 5000 to about 30,000 in continuous operations with relatively long on-stream periods and clean catalysts.

The present process may be employed for the production of relatively high molecular weight ethylene or propylene hetero- and homo-polymers at relatively low pressures. The process of the present invention may be effected to some extent even at atmospheric pressure. The upper limit of polymerization pressure is dictated by economic considerations and equipment limitations and may be 10,000 p. s. i. g., 20,000 p. s. i. g., or even more. A generally useful and economically desirable polymerization pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in a liquid reaction medium, which is usually an aromatic hydrocarbon such as benzene, xylenes or tetralin, or a cycloaliphatic hydrocarbon, such as decalin (decahydronaphthalene). The amount of ethylene or propylene in such solutions may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products may drop sharply. The rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, the resultant solutions of ethylene polymer in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between one-half and about 10 hours, usually between about 1 and about 4 hours, are employed and the reaction autoclave is charged with olefin as the pressure falls as a result of the olefin conversion reaction.

The solvent:catalyst weight ratio can be varied in the range of about 5 to about 3000, or even higher for flow systems. The employment of high solvent:catalyst ratios, which is rendered possible by the presence of an alkali metal aluminum hydride in the reaction zone, is very important in obtaining high yields of polymer.

The olefin charging stocks may be polymerized in the gas phase and in the absence of a liquid reaction medium by contact with catalysts produced by admixing an alkali metal aluminum hydride and vanadia or other group VA catalysts. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of the olefin in the presence of suitable liquid reaction media. The liquid reaction medium may also be employed as a means of contacting the olefin with catalyst by preparing a solution of the olefin feed stock in the liquid reaction medium and contacting the resultant solution with the polymerization catalyst.

The liquid reaction medium functions as a solvent for the olefin to bring the olefin into the necessary contact with the catalyst surface and/or growing olefin polymer chain. The medium dissolves some of the normally solid product from the catalyst surface.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, octenes, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, phosphoric acid or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C. P. xylenes by refluxing with a mixture of 7.5 weight percent $MoO_3$-on-$Al_2O_3$ hydroforming catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH plus catalyst in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

When solvents such as xylenes are employed some alkylation thereof by ethylene can occur under the reaction conditions. Propylene is a far more reactive alkylating agent than ethylene and when propylene is present in the feed, it is desirable to employ a non-alkylatable solvent such as decalin. The alkylate is removed with grease in the present process, can be separated therefrom by fractional distillation and can, if desired, be returned to the polymerization zone.

The following examples are presented for the purpose of illustrating but not unduly limiting the claimed invention. Unless otherwise indicated, the general procedure which was employed in batch operations was as follows. The reactions were carried out in pressure vessels provided with magnetically operated stirring mechanisms. The reactor was charged with the solvent and thereafter with the partially reduced group VA metal oxide catalyst. The gas space in the reactor was blanketed with nitrogen. The hydride in powdered form was then added to the reaction vessel, whereupon the head was fitted while maintaining a flow of nitrogen to keep the system free of air. The reaction vessels were pressure-tested with hydrogen. The final component, the olefin, was charged to the reaction vessel after the latter had been heated to the reaction temperature. The magnetically-driven stirrup-type stirrer was alternatively lifted and plunged down through the solution at a rate sufficient to keep the catalyst in suspension. Olefin feed was introduced from time to time during the course of the run in order to maintain the reaction pressure. A minor hydrogen partial pressure of the order of about 100–200 p. s. i. may be superimposed on the olefin partial pressure when the reaction fails to start readily. By plotting cumulative pressure drop against cumulative time, the progress of a run can be followed.

In the examples, specific visocity is $\times 10^5$ (relative viscosity $-1$) and relative viscosity is the ratio of the time of efflux of a solution of 0.125 g. polymer in 100 c. c. C. P. xylenes at 110° C. from the viscosimeter as compared with the time of efflux of 100 cc. of C. P. xylenes at 110° C. The melt viscosity was determined by the method of Dienes and Klemm, J. Appl. Phys. 17, 458–71 (1946).

To determine whether or not $LiAlH_4$ is itself a catalyst under the conditions we usually employ for the polymerization of ethylene, 1.0 g. of $LiAlH_4$ and 50 cc. benzene were charged to a reaction bomb. The bomb was heated to 130° C. and 900 p s. i. of ethylene was charged to the bomb. The temperature was gradually increased to 175° C. at which point a definite pressure drop was obtained. No further pressure drop was obtained until the temperature was raised to 240–250° C. The rate of polymerization was rapid and increased linearly to a pressure drop of 1520 p. s. i. at which time the run was stopped. The run yielded 18.6 g. of products. The overall analysis of the products as determined by mass spectrometer and fractional distillation was as follows: $C_4$, 22%; $C_6$, 30%; $C_8$, 23%; $C_{10}$, 11%; $C_{12}$, 7%; $C_{14}$, 4%; $C_{16+}$, 3%. No solid polymer was formed. By infra-red analysis the $C_4$ fraction was found to be butene-1. The $C_6$ fraction was 3.6% hexanes and 96.4% hexenes. The latter were present in the proportion of 40% 1-hexene, 10% 2-ethyl-1-butene, and 50% 3-methyl-1-pentene. The $C_8$ fraction consisted of vinyl (octene-1) and branched terminal olefins.

$LiAlH_4$ (1.0 g.) and activated gamma-alumina (11.8 g.) were added to a reaction bomb, then 50 cc. of purified xylenes, the temperature was raised to 230° C. and ethylene was pressured into the reactor to an initial pressure of 900 p. s. i. g. During the reaction period, a pressure drop of 725 p. s. i. was observed. The reaction bomb was thereafter cooled and opened and it was found that no solid polymers had been produced but only some butenes and a small amount of grease-like ethylene polymers.

Alkali metal aluminum hydride promoters permit the employment of very high solvent:catalyst ratios while maintaining relatively high polymerization rates, which in turn permits continuous processing and long catalyst life and also results in the production of much higher solid polyethylene yields per weight of metal oxide catalyst which is employed.

*Example 1*

A 100 ml. reactor was charged with 50 cc. of dehydrated and deoxygenated commercial xylenes and 5 g. of 30–100 mesh 10 weight percent pre-reduced $V_2O_5$ supported upon gamma-alumina. The catalyst had been pre-reduced with molecular hydrogen at 350° C. and atmospheric pressure for 16 hours. The reactor was also charged with 0.5 g. $LiAlH_4$. The reactor was pressure-tested with hydrogen, following which dried commercial ethylene was injected to an initial pressure of 775 p. s. i. after the reactor had been heated to 230° C. Polymerization was continued for a period of 11.5 hours, ethylene being injected from time to time to maintain a suitable ethylene concentration in the reaction zone. The reaction resulted in a yield of a solid ethylene polymer in the proportion of 97 weight percent, based on the weight of the partially reduced $V_2O_5$-$Al_2O_3$ catalyst, together with 17 weight percent of a grease-like ethylene polymer and 24 weight percent of xylenes alkylate. The solid ethylene polymer was molded into a tough and flexible film. The solid ethylene polymer was characterized by the especially high density of 0.9988 (24/4° C.) and had a melt viscosity of $3.6 \times 10^5$ poises. It appears that the solid ethylene polymer is almost entirely (99%) crystalline, which would indicate especially low water vapor transmission through a film prepared from the polymer.

*Example 2*

The 250 cc. reactor was charged with 100 cc. of purified toluene, 1 g. of 10 weight percent $V_2O_5$ supported upon silica gel (no prereduction) and 0.25 g. of lithium aluminum hydride. The reactor contents were heated with stirring under a blanket of hydrogen to 229° C. and ethylene was then injected to the initial pressure of 790 p. s. i. The reaction was continued for 22 hours over the course of which the total pressure drop was 220 p. s. i. The reaction yielded 87 weight percent of solid ethylene polymer, based on the weight of the vanadia catalyst, together with 190 weight percent of solid, grease-like ethylene polymers. The solid ethylene polymer obtained in 87% yield was characterized by a density at 24° C. of 0.9655 and melt viscosity of $1.75 \times 10^5$ poises.

*Example 3*

The 250 cc. reactor was charged with 100 cc. of purified toluene, 0.25 g. of $NaAlH_4$ and 2 g. of 40-mesh 10 weight percent $V_2O_5$ supported upon silica gel which was prereduced with hydrogen at 350° C. and atmospheric pressure for 16 hours. The reactor contents were heated with stirring under a blanket of hydrogen to 204° C. and ethylene was then injected to the initial pressure of 810 p. s. i. Reaction was continued for 20.5 hours, resulting in a total pressure drop of 1305 p. s. i. The reaction yielded 28 weight percent of solid ethylene polymer, based on the weight of the vanadia catalyst.

*Example 4*

In this experiment both ethylene and propylene were charged to the reactor to produce a solid polymer. The 250 cc. reactor was charged with 100 cc. of purified toluene, 5 g. of 10 weight percent $V_2O_5$ supported upon silica gel (prereduced with hydrogen at 350° C., 1 atmosphere, 16 hours) and 0.5 g. LiAlH₄. The reactor contents were heated with stirring to 201° C. under a blanket of hydrogen and ethylene was then injected to the initial partial pressure of 539 p. s. i., together with propylene to the initial partial pressure of 345 p. s. i. Over the reaction period of 19.5 hours the total pressure drop was 715 p. s. i. The reaction yielded a solid polymer in the proportion of 50 weight percent, based on the weight of the vanadia catalyst, together with 88 weight percent of solid, grease-like polymers. The density of the polymer produced in 50% yield was 0.9482 at 24° C. and its melt viscosity was $1.3 \times 10^6$ poises. The reaction also yielded sec.-butylbenzene in the amount of 12.5 cc.

*Example 5*

The catalyst employed in this operation was unsupported $Ta_2O_5$ which had been prereduced with molecular hydrogen at atmospheric pressure, 550° C., for 16 hours. A 100 ml. bomb was charged with 5 g. of the prereduced catalyst, 50 cc. of silica gel-treated decalin and 0.5 g. LiAlH₄. The reactor was pressure tested with hydrogen and the contents were heated to 202° C., after which purified commercial ethylene was injected to a partial pressure of 725 p. s. i. Reaction was continued for a period of 18.5 hours, during the course of which ethylene was injected from time to time into the reaction zone. The total ethylene pressure drop was 1115 p. s. i. A solid ethylene polymer was obtained in the yield of 29 weight percent, based on the weight of reduced $Ta_2O_5$. The ethylene polymer had a density at 24° C. of 0.952 and melt viscosity of $1.82 \times 10^5$ poises; it formed a tough, flexible film.

*Example 6*

The group VA catalyst was 10 weight percent $Ta_2O_5$ supported upon gamma alumina, 30 mesh, which was prereduced with molecular hydrogen at 550° C., atmospheric pressure, for 16 hours. A 250 ml. bomb was charged with 5 g. of the group VA catalyst, 0.5 g. LiAlH₄ and 100 cc. of silica gel-treated decalin. After pressure testing with hydrogen, the contents of the reactor were heated to 200° C., after which purified commercial ethylene was injected to a pressure of 910 p. s. i. Reaction was continued for a period of 21 hours, with intermittent injection of ethylene. The total ethylene pressure drop was 1640 p. s. i. The reaction yielded 16 weight percent of solid ethylene polymer, based on the weight of group VA metal oxide catalyst, characterized by the specific viscosity of 15,400 and density of 0.9758 at 24° C. Some grease-like ethylene polymer was also produced, together with a smaller proportion of alkylated decalins.

*Example 7*

The group VA metal oxide catalyst was 10 weight percent $Ta_2O_5$ supported upon silica gel, 100 mesh, which was reduced before use with molecular hydrogen at 550° C., atmospheric pressure, for 16 hours. A 250 ml. bomb was charged with 5 g. of the prereduced group VA metal oxide catalyst, 0.5 g. LiAlH₄ and 100 cc. of silica gel-treated decalin. The reactor contents were brought to 200° C. and purified commercial ethylene was injected to the pressure of 805 p. s. i. Reaction was continued for 14.5 hours, with intermittent ethylene injection. The total ethylene pressure drop was 1190 p. s. i. The reaction yielded 10 weight percent of solid ethylene polymer, based on the weight of the tantalum oxide catalyst, together with some grease-like ethylene polymer. The polymer had a density at 24° C. of 0.960 and specific viscosity of 13,900.

*Example 8*

The process of Example 1 is repeated but 10 weight percent $Nb_2O_5$ on silica (reduced with hydrogen at 400° C., 1 atmosphere, 16 hours) is substituted for the vanadia catalyst. The solid ethylene polymer is worked up as before.

In lieu of, or in addition to, the alkali metal aluminum hydride promoters, we may employ other metal aluminum hydrides such as alkaline earth metal aluminum hydrides, particularly $Ca(AlH_4)_2$ and $Mg(AlH_4)_2$.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc.

The polymers produced by the process of the present invention, especially the polymers having high specific viscosities, can be blended with the lower molecular weight polyethylenes to impart stiffness or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity$\times 10^5$ of about 50,000 in about one liter of xylenes at a temperature close to the boiling point produced an extremely viscous solution.

The polymers produced by the present process can be subjected to chemical modifying treatments, such as halogenation, halogenation followed by dehalogenation, sulfohalogenation by treatment with sulfuryl chloride, sulfonation and other reactions to which hydrocarbons may be subjected.

This application is a continuation-in-part of our previous application, Serial No. 324,608, filed December 6, 1952. The operational schemes and flow diagram of Serial No. 324,608 may be employed with the catalysts herein claimed.

Having thus described our invention, what we claim is:

1. In a process for the production of a polymeric hydrocarbon material having a molecular weight of at least 300, the steps of contacting a normally gaseous olefin selected from the class consisting of ethylene, propylene and mixtures containing ethylene and propylene with a catalytic mixture prepared by admixing an alkali metal aluminum hydride with an oxide of a metal of group VA of the periodic table at a reaction temperature between about 130° C. and about 325° C., and separating a polymeric hydrocarbon material having a molecular weight of at least 300 thus produced.

2. The process of claim 1 wherein said group VA metal oxide is supported upon a major proportion of a difficultly reducible metal oxide.

3. In a process for the production of a normally solid ethylene polymer, the steps of contacting ethylene with a catalytic mixture prepared by admixing an alkali metal aluminum hydride with an oxide of a metal of group VA of the periodic table, effecting said contacting in the presence of a liquid hydrocarbon reaction medium at a reaction temperature between about 130° C. and about 325° C., and separating a normally solid ethylene polymer thus produced.

4. The process of claim 3 wherein said group VA metal oxide is supported upon a major proportion of a difficultly reducible metal oxide.

5. The process of claim 3 wherein said liquid hydrocarbon reaction medium is a saturated hydrocarbon.

6. The process of claim 3 wherein said liquid hydrocarbon reaction medium is a monocyclic aromatic hydrocarbon.

7. The process of claim 3 wherein said hydride is LiAlH$_4$.

8. The process of claim 3 wherein said hydride is NaAlH$_4$.

9. In a process for the production of a normally solid, resinous hydrocarbon material, the steps which comprise contacting ethylene and a liquid hydrocarbon reaction medium with a catalytic mixture prepared by admixing an alkali metal aluminum hydride with a catalyst comprising essentially a minor proportion of an oxide of a metal of group VA supported upon a major proportion of a difficultly reducible metal oxide, the ratio of alkali metal aluminum hydride to metal oxide catalyst being between about 0.005 and about 2 by weight, at a temperature between about 130° C. and about 325° C. and a pressure between about 200 and about 5000 p. s. i. g., and separating a normally solid, resinous hydrocarbon material thus produced.

10. The process of claim 9 wherein the hydride is lithium aluminum hydride, the liquid reaction medium is an aromatic hydrocarbon and the metal oxide is a vanadium oxide supported on alumina.

11. The process of claim 9 wherein the hydride is lithium aluminum hydride, the liquid reaction medium is an aromatic hydrocarbon and the metal oxide is a vanadium oxide supported on silica.

12. The process of claim 9 wherein the hydride is lithium aluminum hydride, the liquid reaction medium is decalin and the catalyst comprises essentially an oxide of tantalum.

13. The process of claim 9 wherein the group VA metal oxide is prereduced before use by hydrogen at a temperature between about 250° C. and about 850° C.

References Cited in the file of this patent

UNITED STATES PATENTS 2,500,197    Michael _____ Mar. 14, 1950